United States Patent
Aoki et al.

(10) Patent No.: US 6,515,229 B2
(45) Date of Patent: Feb. 4, 2003

(54) STRUCTURE OF INSTALLING WIRE HARNESS FOR SLIDING DOOR

(75) Inventors: Tohru Aoki, Shizuoka (JP); Kenichi Doshita, Shizuoka (JP); Mitsunori Tsunoda, Shizuoka (JP); Rhoichi Fukumoto, Aichi (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/892,892

(22) Filed: Jun. 28, 2001

(65) Prior Publication Data

US 2002/0014348 A1 Feb. 7, 2002

(30) Foreign Application Priority Data

Jun. 30, 2000 (JP) ........................................ 2000-198689

(51) Int. Cl.[7] .............................. H02G 3/02; B60J 5/06
(52) U.S. Cl. ..................... 174/72 A; 174/69; 191/23 R; 296/155; 439/162
(58) Field of Search ................................ 174/69, 70 C, 174/70 R, 72 A, 72 C, 135, 136; 191/22 R, 23 R; 49/26, 27, 28; 296/146.1, 149, 152, 155, 208; 439/162

(56) References Cited

U.S. PATENT DOCUMENTS

| 5,322,339 A | * | 6/1994 | Dubernard | 296/155 |
| 5,466,036 A | * | 11/1995 | Stroeters et al. | 296/208 |
| 6,161,894 A | * | 12/2000 | Chapman | 296/155 |
| 6,174,020 B1 | * | 1/2001 | Knettle et al. | 296/155 |
| 6,176,715 B1 | * | 1/2001 | Buescher | 439/162 |
| 6,183,040 B1 | * | 2/2001 | Imaizumi et al. | 296/155 |
| 6,293,803 B1 | * | 9/2001 | Rust et al. | 174/69 |
| 6,328,374 B1 | * | 12/2001 | Patel | 296/155 |
| 6,340,199 B1 | * | 1/2002 | Fukumoto et al. | 296/155 |

FOREIGN PATENT DOCUMENTS

| DE | 100 00 930 | 7/2000 |
| JP | 7-222274 | 8/1995 |
| JP | 2000-255341 | 9/2000 |

OTHER PUBLICATIONS

Copy of Great Britain Patent Office Communication with search report for corresponding Great Britain Patent Application No. 0114974.9 dated Dec. 6, 2001.

* cited by examiner

Primary Examiner—Chau N. Nguyen
Assistant Examiner—Adolfo Nino
(74) Attorney, Agent, or Firm—Armstrong, Westerman & Hattori, LLP

(57) ABSTRACT

A structure of installing a wire harness for a sliding door includes a harness protective tube 2 in which electric wires are contained to compose the wire harness. The harness protective tube 2 is curved at the sliding door side and installed at a vehicle body side. The harness protective tube 2 has an oval shape in cross section, and is curved in a direction of its longer diameter portions 3 at the sliding door side so that the longer diameter portions are positioned in a vertical direction, whereby harness slack absorbing function is imparted to the harness protective tube. The longer diameter portions 3 are supported by a support part 11 at the sliding door side, and the harness protective tube 2 is curved in a direction of the longer diameter portions extending from the support part to the vehicle body side. There is provided a protector 5 in which the support part 11 is positioned, and the harness protective tube 2 is contained in a curved state in a direction of the longer diameter portions 3. The longer diameter portions 3 in a curved section 2a of the harness protective tube 2 are urged upward by an elastic member 7.

4 Claims, 4 Drawing Sheets

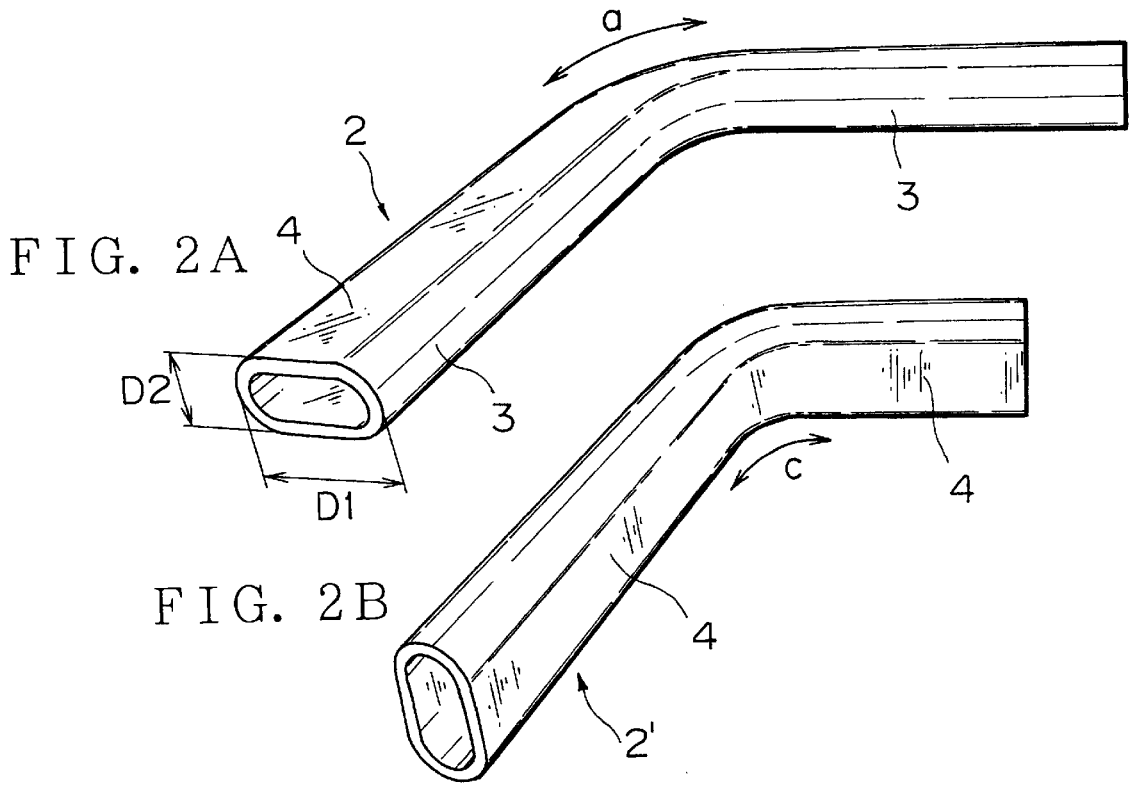
FIG. 2A
FIG. 2B
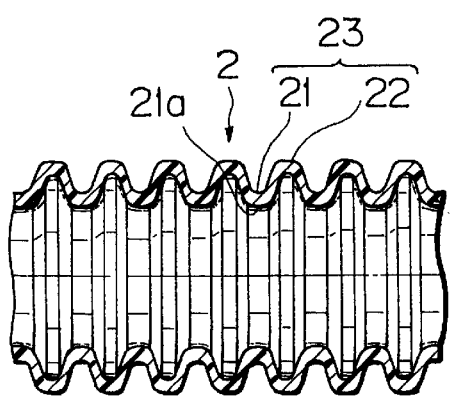
FIG. 3

STRUCTURE OF INSTALLING WIRE HARNESS FOR SLIDING DOOR

BACKGROUND OF THE INVENTION

1. Field of the Invention

The present invention relates to a structure of installing a wire harness for a sliding door, and more particularly to the structure of installation in which the wire harness is installed from a sliding door side toward a vehicle body side employing a harness protective tube such as a corrugated tube in an oval shape so that slack of the wire harness following opening and closing movement of the sliding door can be absorbed.

2. Description of the Related Art

There have been proposed various kinds of structures of installing wire harnesses for sliding doors in order to supply electric power from a vehicle body (power supply) to functional components in the sliding doors which are employed in a one boxed car or a station wagon, or to send electric signals from the sliding door to the vehicle body.

The sliding door is equipped with various functional components such as a power window motor, door lock unit, speaker, switch unit, electronic control unit, etc. to or from which electric power or signal currents are supplied or received. It is necessary to supply or receive the electric power not only while the door is closed but while the sliding door is open.

FIGS. 6A and 6B show an example of a conventional structure of installing a wire harness for a sliding door which is disclosed in Japanese Patent Laid-open Publication No. 7-222274.

In this structure, a reel 120 capable of feeding and taking up an electric wire (wire harness) 119 according to opening and closing movement of a sliding door 118 is provided on a vehicle body 121. One end of the wire 119 is connected to a speaker 123 which is a door side functional component by means of hinge 122, and the other end of the wire 119 is connected to an audio apparatus (not shown) which is a vehicle body side functional component.

When the sliding door 118 is closed as shown in FIG. 6A, the wire 119 is fed from the reel 120 and extends, and when the sliding door 118 is opened as shown in FIG. 6B, the wire 119 is rolled up on the reel 120. The sliding door 118 moves forward in tight contact with the vehicle body when it is closed, and moves backward apart from the vehicle body outwardly when it is opened. In this manner, the sliding door 118 moves at least in two dimensions.

However, there has been an anxiety in the above described structure that the wire 119 may be damaged because the wire 119 has to be rolled up many times on the reel 120. There has been a further problem that application has been difficult, since the wire harness including a number of circuits (electric wires) has poor flexibility.

There has been proposed another structure of installing a wire harness for a sliding door in which a flexible flat cable is arranged from the vehicle body to the sliding door, so that door strokes can be absorbed by bending the flat cable according to opening and closing movement of the sliding door.

However, this structure has had a problem that because the flat cable is composed of printed circuit conductors and insulating sheets having small sectional areas, its power supply capacity is too small and can be only used to supply of electric current having small capacity or signals, but cannot be used for power supply.

There has been a further problem that in case where a small number of electric wires are connected to various functional components by a junction switch system, this would result in an increase of cost.

In order to solve the above described problems, the applicant has proposed in a prior patent application a slack absorbing apparatus for a wire harness in which the wire harness is contained in a sliding door in a state of semicircular curve, and pushed upward by a leaf spring.

The wire harness is covered with a protective tube such as a corrugated tube made of synthetic resin. The corrugated tube is a tube which is circular in cross section and provided with circumferential grooves and ridges alternately formed in a longitudinal direction.

With opening operation of the sliding door, the sliding door retreats while moving outward away from the vehicle body, and the wire harness inside the sliding door is contracted in diameter. When the sliding door is fully opened, a portion of the wire harness extending from the sliding door to the vehicle body is pulled in a forward direction. On the other hand, with closing operation of the sliding door, the sliding door advances while moving close to the vehicle body, and the wire harness inside the sliding door is enlarged in diameter, and the portion of the wire harness extending from the sliding door to the vehicle body is pulled in a backward direction. In this manner, the slack of the wire harness can be absorbed.

In the above described structure, however, the wire harness has to be arranged diagonally upward from the sliding door to the vehicle body, especially in case where the harness slack absorbing apparatus at the sliding door side or a guide out portion of the wire harness from the harness slack absorbing apparatus is at a lower position than a wire harness at the vehicle body side. Therefore, there has been an anxiety that the wire harness may be caught between the sliding door and the vehicle body.

More particularly, the wire harness is brought near a step (made of a metal panel) of the vehicle body just before the sliding door is closed. On this occasion, the wire harness tends to hang lower than the step, and it has been feared that the wire harness may be caught between the step and a door trim of synthetic resin inside the sliding door. If the wire harness should happen to be caught, the protective tube covering the wire harness may be damaged or the electric wires composing the wire harness may be broken in the worst case. In such a case, power supply to the sliding door and transmission of signals from the sliding door are interrupted, to stop up and down operations of the power windows and opening/closing motions of the sliding door which are electrically driven.

In order to prevent the wire harness from being caught, it has been considered that stronger resiliency may be given to the leaf spring for pushing the wire harness upward. In this case, however, strong pressure is exerted to the wire harness and the protective tube even in a fully open state or a fully closed state of the sliding door in which the leaf spring is not required, and the protective tube is likely to be damaged. In addition, the cost for the leaf spring will be increased.

In case where the wire harness is arranged diagonally upwardly from the sliding door to the vehicle body, it has been feared that the wire harness may be bent at an angle as large as 90 degree, exerting superfluous stress to the bent portion. In this case too, the wire harness may be damaged, or expanding and contracting movement of the wire harness following the opening and closing operation of the sliding door may not be smoothly conducted.

Further, because the corrugated tube has a relatively large diameter and requires a large space for arrangement, there has been problems with respect to space and design that the harness slack absorbing apparatus may become large-sized, and the door trim must be bulged into the vehicle room.

In view of the above described problems, an object of the present invention is to provide a structure of installing a wire harness for a sliding door in which the wire harness will not be caught between the sliding door and the vehicle body with closing operation of the sliding door, superfluous bending force or pressure will not be exerted on the wire harness when the sliding door is opened and closed, or stands still, and which can prevent the wire harness including a protective tube from being damaged or deformed without incurring a cost, and can smoothly and reliably absorb slack of the wire harness at opening and closing of the sliding door, preventing upsizing of the harness slack absorbing apparatus, and improving aesthetic appearance of a door trim.

SUMMARY OF THE INVENTION

In order to attain the above described object, there is provided according to the present invention, a structure of installing a wire harness for a sliding door comprising a harness protective tube in which electric wires are contained to compose the wire harness, the harness protective tube being curved at the sliding door side and installed at a vehicle body side, wherein the harness protective tube has an oval shape in cross section, and is curved in a direction of its longer diameter portions at the sliding door side so that the longer diameter portions are positioned in a vertical direction, whereby harness slack absorbing function is imparted to the harness protective tube.

According to a second aspect of the invention, the longer diameter portions of the harness protective tube having an oval shape in cross section are supported by a support part at the sliding door side, and the harness protective tube is curved in a direction of the longer diameter portions extending from the support part to the vehicle body side.

According to a third aspect of the invention, there is further provided a protector in which the support part is positioned, and the harness protective tube having an oval shape in cross section is contained in a curved state in a direction of the longer diameter portions.

According to a fourth aspect of the invention, the longer diameter portions in a curved section of the harness protective tube are urged upward by an elastic member.

According to the invention, by installing the harness protective tube having an oval shape in cross section so as to be curved in a direction of the longer diameter portions, even though the wire harness including the harness protective tube is pulled or hangs down when the sliding door is opened or closed, slack of the wire harness will be rapidly, smoothly and reliably absorbed, because the harness protective tube having an oval shape in cross section exerts strong elastic repulsive force as compared with a harness protective tube having a circular cross section and can be rapidly and reliably restored to the original curved posture. Therefore, the wire harness will not hang down when the sliding door is closed, and a catch of the wire harness between the sliding door and the vehicle body can be avoided. Thus, the wire harness will be prevented from being deformed or damaged.

Moreover, owing to improvement in restoring performance of the wire harness, force of the leaf spring can be made weaker than in the conventional case or the leaf spring can be omitted, resulting in a low cost and simple structure. Further, because the leaf spring will not press the wire harness with strong force, deformation or damage of the wire harness will be prevented.

Still further, because the longer diameter portions of the harness protective tube in an oval shape in cross section are arranged in a vertical direction, and the shorter diameter portions of the harness protective tube are arranged in a direction of thickness of the sliding door, a space in the sliding door for installing the harness can be saved with respect to thickness. Accordingly, a door trim for containing the harness will not bulge or less bulge to improve aesthetic appearance of the door trim, and at the same time, the harness slack absorbing apparatus composed of the harness protective tube can be made compact with respect to thickness.

According to the second aspect of the invention, because the harness protective tube having an oval shape in cross section is curved in a direction of the longer diameter portions in a state where the longer diameter portions are supported by the support part, the wire harness including the harness protective tube will be pulled about the support part as an axis and exert strong restoring force. This will promote the effect of the invention.

According to the third aspect of the invention, because the harness protective tube having an oval shape in cross section is contained in the protector in a state where the longer diameter portions are positioned in a vertical direction, the protector can be made compact in a direction of thickness. Accordingly, the door trim for containing the protector will not bulge or less bulge to improve aesthetic appearance of the door trim. Further, because the wide shorter diameter portions of the harness protective tube having an oval shape in cross section are in contact with a vertical plane of the protector, the posture of the harness protective tube can be stabilized. Accordingly, the longer diameter portions are always positioned in a vertical direction, and the harness protective tube can be always held in a curved state in the direction of the longer diameter portions, thus enhancing harness slack absorbing performance.

According to the fourth aspect of the invention, because the longer diameter portions of the harness protective tube are urged upward by the elastic member, the longer diameter portions are always positioned in a vertical direction, and the harness protective tube can be always held in a curved state in the direction of the longer diameter portions, thus enhancing harness slack absorbing performance. In addition, the restoring force of the harness protective tube is enhanced because the harness protective tube is curved in the direction of the longer diameter portions, the elastic member can be only assisting means. Therefore, the elastic member having a small width can be employed along the longer diameter portion having a small width, and the harness slack absorbing apparatus or the protector can be made compact with respect to thickness.

BRIEF DESCRIPTION OF THE DRAWINGS

FIG. 2A is a perspective view of a flat corrugated tube employed in the invention in a state where the tube is bent in a direction of its longer diameter portions;

FIG. 2B is a perspective view of the flat corrugated tube in a state where the tube is bent in a direction of its shorter diameter portions;

FIG. 3 is a sectional view in more detail of the flat corrugated tube;

DESCRIPTION OF THE PREFERRED EMBODIMENT

Figure 1:
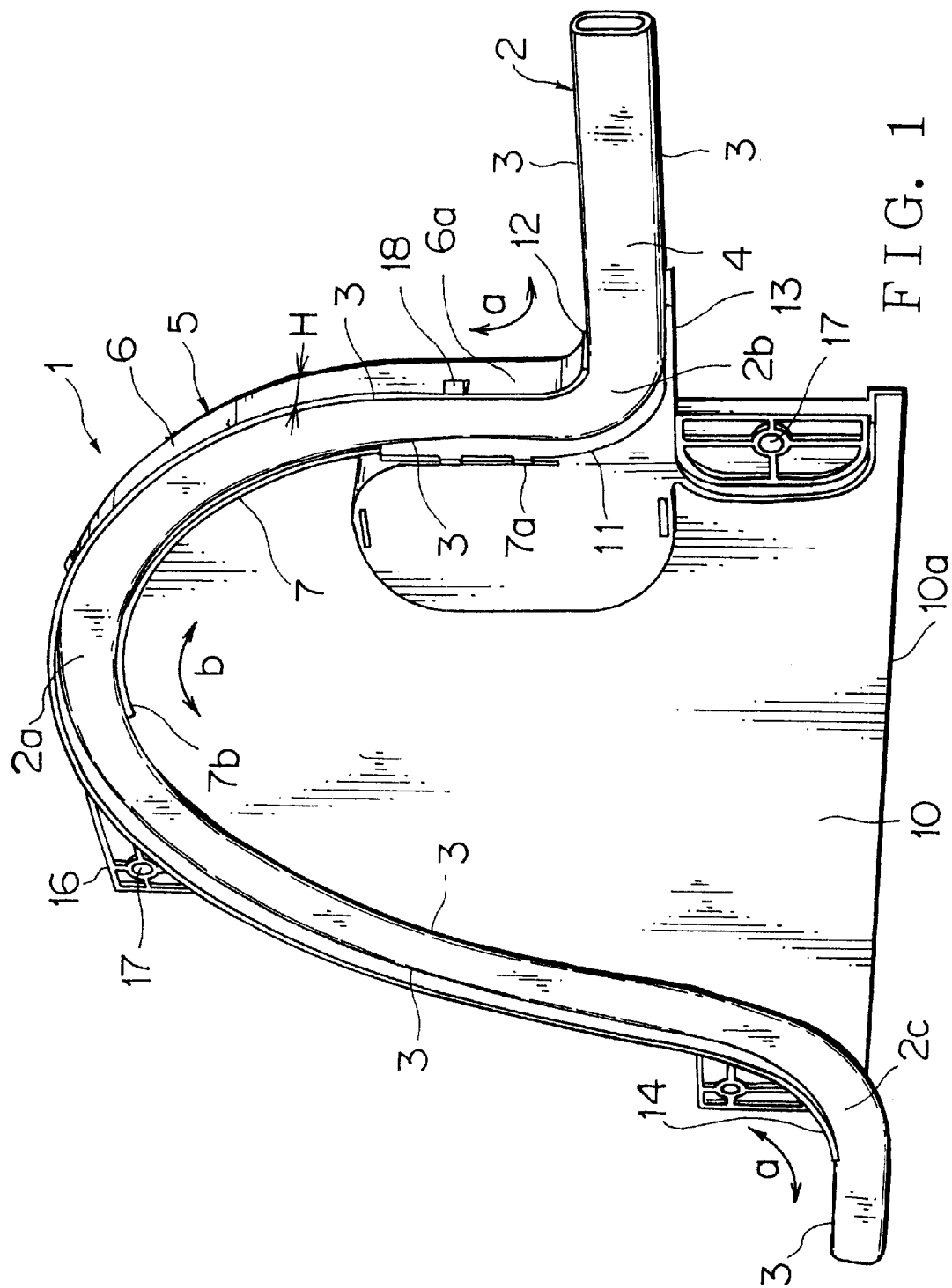
FIG. 1 is a perspective view showing an essential part of an embodiment of a structure of installing a wire harness for a sliding door according to the present invention.

Now, an embodiment according to the present invention will be described referring to the drawings.

There is provided an apparatus 1 for absorbing slack (extra length) of a wire harness at a sliding door side employing a flat corrugated tube 2 having an oval shape in cross section as a harness protective tube in which electric wires are contained. The flat corrugated tube 2 is curved in a direction of its longer diameter portions 3 (for example, in a direction where the longer diameter portions 3 on an upper side approach each other as shown by an arrow a in FIG. 1 and the longer diameter portions 3 on a lower side approach each other as shown by an arrow b in FIG. 1), so that the longer diameter portions 3 are positioned in a vertical direction, and its shorter diameter portions 4 are positioned in a horizontal direction.

Referring to FIG. 1, the harness slack absorbing device 1 consists of a protector 5 made of synthetic resin and having a curved part 6 in a semi-circular shape, the flat corrugated tube (harness protective tube) 2 which is bent in a direction of its longer diameter portions 3 along the curved part 6, and a leaf spring 7 supporting the flat corrugated tube 2 in a thus bent state.

The protector 5 includes a base plate part 10 having its outer surface abutted against a door inner panel 9 and its inner surface abutted against a shorter diameter portion 4 of the flat corrugated tube 2, and the curved part 6 projecting toward a door trim cover (not shown) along an upper edge of the base plate part 10 and capable of contacting at its inner face with an outer face of the longer diameter portion 3 of the flat corrugated tube 2. There is formed a support part 11 along an erected portion 6a at a forward end of the curved part 6 to support the longer diameter portion 3 of the flat corrugated tube 2 in a forward area of a main largely curved section 2a in cooperation with the erected portion 6a. A cover (not shown) fitted to an outer surface of the curved part 6 and abutted against the shorter diameter portion 4 of the flat corrugated tube 2 is provided opposed to the base plate part 10.

A skirt of the erected portion 6a at the forward end of the protector 5 is acutely curved at 12 in a forward direction, and a skirt of the support part 11 opposed to the erected portion 6a is similarly curved at 13 in a forward direction. Both the curved portions 12, 13 constitute a harness guide out part at a forward side. At a backward side of the protector 5, the curved part 6 is gently curved at 14. The curved portions 12 to 14 at the forward and the backward sides of the protector 5 are inversely curved to the main curved part 6. A lower end 10a of the base plate part 10 is open downward.

The flat corrugated tube 2 is horizontally introduced from the harness guide out part at the forward side of the protector 5, curved (at 2b) upward along the forward curved portions 12, 13, inversely curved (at 2a) in a semi-circular shape along the main curved part 6 with a large radius, and then curved (at 2c) to be guided out from the backward harness guide out part 14. Alternatively, the flat corrugated tube 2 is guided out from the lower opening 10a.

The forward curved section 2b of the flat corrugated tube 2 is in contact with the forward curved portions 12, 13 and the support part 11 of the protector 5 at its longer diameter portions 3. The main curved section 2a of the flat corrugated tube 2 is in contact with the main curved part 6 of the protector 5 at its longer diameter portions 3. The backward curved section 2c of the flat corrugated tube 2 is in contact with the backward curved portions 14 of the protector 5 at its longer diameter portions 3. The shorter diameter portions 4 on both sides of the flat corrugated tube 2 are in contact with the base plate part 10 of the protector 5 and the cover (not shown). The shorter diameter portions 4 having a large width are kept in contact with the base plate part 10 and the cover in a broad plane, and so, a posture of the flat corrugated tube 2 with the larger diameter portions 3 set in a vertical direction can be stabilized.

The protector 5 incorporating the flat corrugated tube 2 is fixed to the door inner panel 9 (See FIG. 4) by inserting bolts or locking clips (not shown) into holes 17 in the base plate part 10 and an extension bracket 16. Locking holes or elastic locking frames formed in the cover (not shown) are engaged with locking projections 18 in the curved part 6 of the protector 5.

The leaf spring 7 is in contact with a curved inner face of the longer diameter portion 3 in the curved section 2a of the flat corrugated tube 2 in a forward half thereof, and urges the curved section 2a upward. One end 7a of the leaf spring 7 is fixed to the support part 11 of the protector 5, while the other end 7b is fixed to the flat corrugated tube 2 by fixing means such as a vinyl tape or a band which is not shown. The leaf spring 7 which is thinner than a conventional one may be employed as described below.

The wire harness is composed of the flat corrugated tube 2 and a plurality of electric wires (not shown) contained inside the flat corrugated tube 2. The plurality of the electric wires are arranged in an inner space of the flat corrugated tube 2 substantially in parallel (in a vertical arrangement in FIG. 1) and substantially in a flat shape.

Inside the harness slack absorbing apparatus 1, the flat corrugated tube 2 is bent in a direction of the larger diameter portions 3, that is, in such a direction that the narrow sides of the corrugated tube 2 approach each other as shown by an arrow mark a in FIG. 2A. This figure will create strong restoring force (repulsive force) when the wire harness is released from tensile force, and inside the protector 5, the flat corrugated tube 2 including the plurality of electric wires (not shown) will be rapidly and reliably restored to its initial posture, that is, the curved shape having a large diameter as shown in FIG. 1. In this manner, the slack of the wire harness when the sliding door 8 (FIG. 4) is opened and closed can be absorbed rapidly, effectively and accurately.

On the other hand, when the flat corrugated tube 2' is bent in a direction of the shorter diameter portions 4, that is, in such a direction that the broader sides of the corrugated tube 2 approach each other as shown by an arrow mark c in FIG. 2B, the restoring force (repulsive force) is weak, and so, the wire harness remains bent inside the protector. In this case, smooth absorption of the slack of the wire harness will not be performed. The corrugated tube 2 in FIG. 2A and the corrugated tube 2' in FIG. 2B are the same products, but different in the directions in which they are bent.

In a bent posture of the flat corrugated tube 2 in FIG. 2A, elasticity is multiplied by a value of the longer diameter D1 divided by a value of the shorter diameter D2, as compared with the corrugated tube 2' in FIG. 2B, based on a same principle as a case when thickness of the leaf spring has been increased, for example. If the longer diameter D1 is twice as long as the shorter diameter D2 for example, the elasticity will be also doubled.

In a structure where the conventional corrugated tube having a circular cross section (having a same cross sectional area as the flat corrugated tube 2) is employed, the conventional corrugated tube can exert elasticity only at a middle level between those corrugated tubes 2 and 2' in FIGS. 2A and 2B. Restoring force of the conventional corrugated tube is far from the restoring force of the corrugated tube 2 in FIG. 2A.

As described above, by bending the corrugated tube 2 into such a shape as shown in FIG. 2A inside the protector 5, a strong restoring and repulsive force can be obtained. Accordingly, the thin or narrow leaf spring 7 (FIG. 1) can be employed as compared with the leaf spring which has been employed in the harness slack absorbing apparatus containing the conventional corrugated tube having a circular cross section. Alternatively, the leaf spring 7 can be omitted, or another elastic member such as a bar spring can be employed in place of the leaf spring 7.

This operational effect can be also promoted by such a vertical arrangement of a plurality of the electric wires inside the flat corrugated tube, in addition of the shape of the flat corrugated tube in use. More specifically, when the flat corrugated tube having a same cross sectional area as the conventional corrugated tube having a circular cross section is employed, the wires arranged in parallel in a vertical direction are increased in number, and repulsive elasticity of the wires will be increased the more.

Moreover, since the flat corrugated tube 2 is curved in a direction of the larger diameter portions inside the protector 5 as shown in FIG. 1, the projecting height H of the curved part 6 of the protector 5 which is substantially equal to a distance between the base plate part 10 of the protector and the cover (not shown) can be set to be shorter according to the shorter diameter D2 (FIG. 2A) of the flat corrugated tube 2. This will contribute to downsizing, light weight, and low cost of the protector 5. Accordingly, the door trim (not shown) will be less bulged, or not bulged, attaining improvement in aesthetic design of the door trim, saving of the space, easy molding of synthetic resin, and a low cost. Further, since the narrow leaf spring 7 can be employed as described above, downsizing, light weight, and low cost of the harness slack absorbing apparatus 1 can be realized.

FIG. 3 shows the flat corrugated tube 2 in cross section in which circumferential concave grooves 21 and convex ridges 22 are alternately arranged. Outer peripheral faces of the convex ridges 22 constitute a substantially flat plane, while inner peripheral faces 21a of the concave grooves 21 are in a substantially arc shape so that the corrugated tube 2 can be easily bent.

Some of the flat corrugated tube 2 are broken rectilinearly in a longitudinal direction at a position in a circumferential direction, in order to facilitate insertion of the wires into the interior, although the wires may be inserted from an opening at a forward end of the corrugated tube 2. In this case, both sides of the broken parts are overlapped on a peripheral wall 23 of the corrugated tube 2, and wrapped by a tape or the like so that the broken parts may not be opened. Therefore, the repulsive elasticity of the flat corrugated tube 2 can be fully ensured, even though the broken parts have been made.

The concave grooves 21 and the convex ridges 22 of the flat corrugated tube 2 are not shown in FIGS. 1 and 2. Even in case where a flat protective tube having an oval shape in cross section not having the concave grooves 21 and convex ridges 22 is bent in a direction of the longer diameter portions, similar operational effects, that are, increase of the repulsive elasticity and reliable absorption of the harness slack can be attained. However, flexibility of the protective tube and the wire harness may be deteriorated due to lack of the concave grooves 21 and convex ridges 22.

Figure 4:
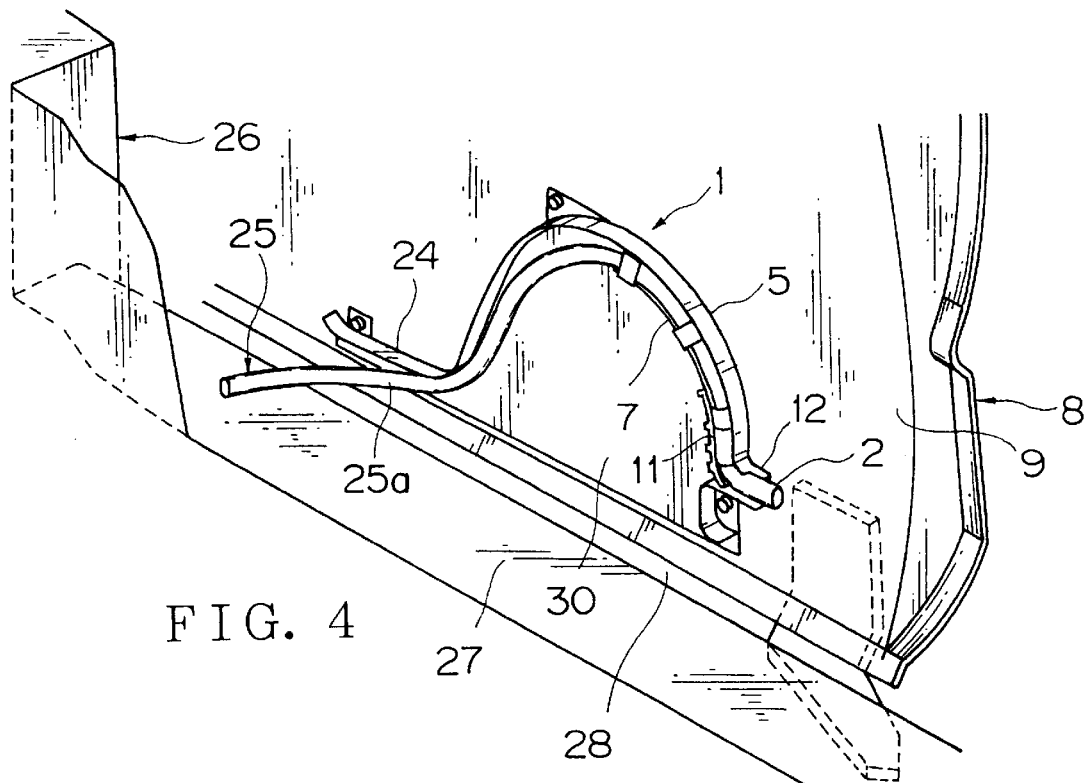
FIG. 4 is a perspective view of a harness slack absorbing apparatus employing the flat corrugated tube which is mounted on the sliding door, in a state where the sliding door is closed.
Figure 5:
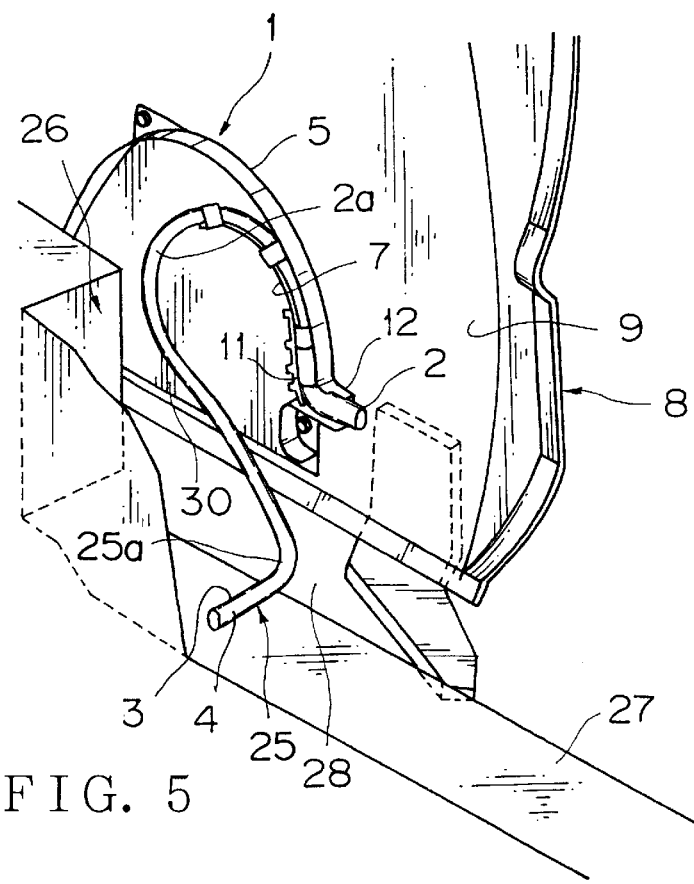
FIG. 5 is a perspective view similar to FIG. 4, in a state where the sliding door is opened.
Figure 6A:
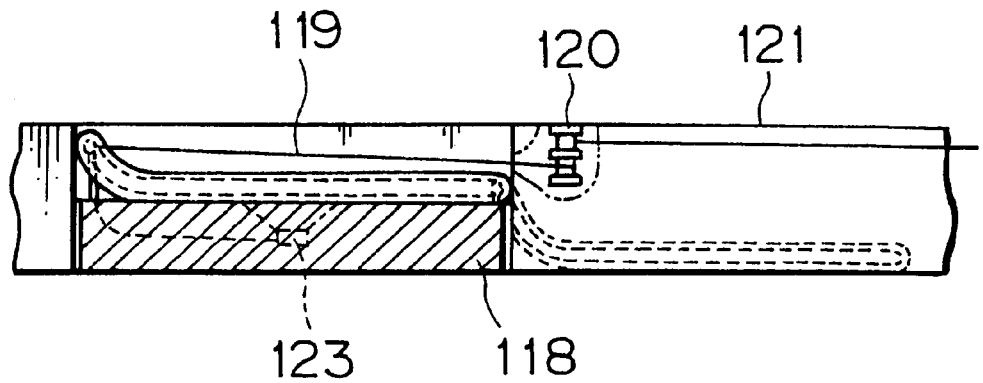
FIG. 6A is a cross sectional view of an example of a conventional structure of installing a wire harness for a sliding door in a fully closed state of the sliding door.
Figure 6B:
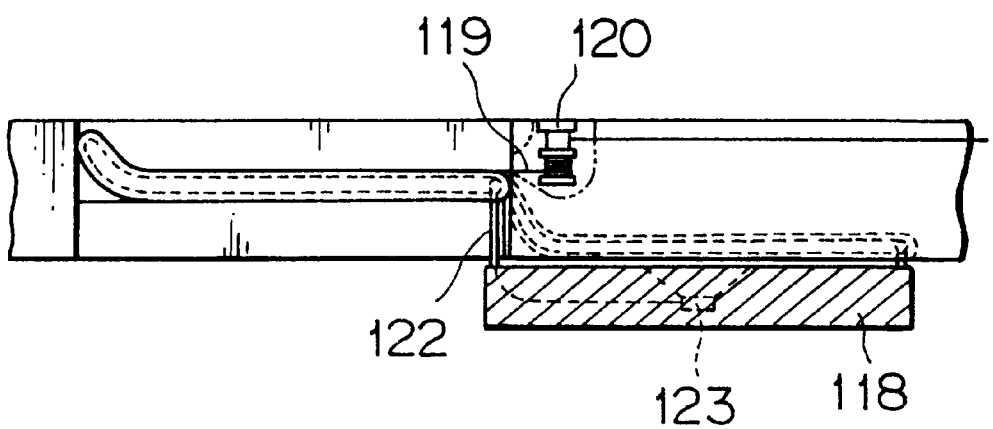
FIG. 6B is a cross sectional view of the same in a fully opened state of the sliding door.

FIGS. 4 and 5 show the states in which the sliding door 8 is opened and closed respectively, after the harness slack absorbing apparatus 1 employing the above described flat corrugated tube 2 has been assembled to the sliding door 8.

FIG. 4 shows the state when the sliding door 8 has been closed or immediately before the sliding door 8 is closed. The wire harness 25 including the flat corrugated tube 2 extends inside the protector 5 while being curved with a large diameter and pulled backward (leftward in FIG. 4). The wire harness 25 is suspended from a guide out part 24 (not shown in FIG. 1) at a backward end of the protector 5 to the vehicle body 26, fixed at a back side of a step 27 of the vehicle body 26 made of metal, and then connected by means of a connector to a wire harness (not shown) in the vehicle body 26 in a further rear of the step 27. The sliding door 8 has approached the vehicle body 26, and a gap 28 between the door 8 and the body 26 has been made narrow. Needless to say, the wire harness 25 includes the flat corrugated tube 2 through which a plurality of electric wires are passed.

The flat corrugated tube 2 is curved in a direction of the longer diameter portions in such a shape as shown in FIG. 1. The forward end of the wire harness 25 is supported at the front end of the protector 5 and guided out from the guiding portion 12 in the forward end area to be connected by means of a connector to various functional components such as electrical equipment, auxiliary components in the sliding door The front half of the curved section 2a of the corrugated tube 2 is urged upward and supported by the leaf spring 7 which is thinner and narrower than in the conventional case. A leaf spring made of synthetic resin can be also used. The leaf spring made of synthetic resin can be integrally molded with the protector 5. In case where only few electric wires are contained in the corrugated tube 2, the slack can be absorbed by the strong restoring force of the flat corrugated tube 2 without employing the leaf spring 7.

If just before the sliding door 8 is closed, the extending part 25a of the wire harness 25 which is a portion of the wire harness between the sliding door 8 and the vehicle body 26 hangs down as shown in FIG. 4, there is a danger that the wire harness 25 may be caught between the sliding door 8 and the step 27 of the vehicle body 26. However, such a danger will be eliminated because the curved section 2a of the wire harness 25 (the corrugated tube 2) is urged upward due to the strong restoring force of the flat corrugated tube 2, and the slack is reliably absorbed.

Hanging amount of the extending part 25a of the wire harness 25 will be the largest in an intermediate state between the closed state of the sliding door 8 in FIG. 4 and the open state of the sliding door 8 in FIG. 5, that is, when the sliding door 8 is half opened. This is because the wire harness 25 is pulled backward in the closed state of the sliding door 8 in FIG. 4, pulled forward in the open state of the sliding door 8 in FIG. 5, and the tensile force is lost in the intermediate state when the sliding door 8 is half open. In this state where the sliding door is half open, the wire harness 25 is urged upward about a fulcrum composed of the support part 11 and the curved portion 12 in the front part of the protector 5. In this manner the wire harness 25 will be prevented from hanging down, and the catch of the wire harness 25 at closing the sliding door 8 can be reliably avoided.

When the sliding door 8 has been slid backward to open, the wire harness 25 is pulled forward (rightward in FIG. 5) while being curved with a small radius inside the protector 5. This is because the wire harness 25 is fixed on the step 27 of the vehicle body 26 and the sliding door 8 is moved backward of the step 27. The extending portion 25a of the wire harness 25 is passed from the opening at the lower end of the protector 5 through a gap between the door trim (not shown) and the door panel 9 to be arranged on the step 27. The sliding door 8 is moved away from the vehicle body 26 to create the large space 28 between the door 8 and the vehicle body 26.

When the sliding door 8 is opened, the curved section 2a of the wire harness 25 is reduced in diameter together with the leaf spring 7 inside the protector 5. However, because the leaf spring 7 having weak elasticity can be used, pressure on the wire harness 25 by the leaf spring 7 can be kept small, thus preventing the wire harness 25 including the corrugated tube 2 from being deformed or damaged.

The longer diameter portions 3, 3 of the flat corrugated tube 2 are positioned in a vertical direction at the portion 25a suspended from the protector 5 to the vehicle body as well as the portion inside the protector 5, as shown in FIGS. 4 and 5, while the shorter diameter portions 4, 4 are positioned in a horizontal direction.

Accordingly, even in case where a lower opening 30 which is the harness guide out part of the protector 5 is positioned at an extremely lower level than the step 27 of the vehicle body 26, and the wire harness 25 is arranged from the sliding door 8 to the vehicle body 26 diagonally upwardly, the extending portion 25a of the wire harness 25 from the sliding door 8 to the vehicle body 26 will not be bent at a substantially right angle into a crank shape at its upper side and lower side, but smoothly bent into a gently curved shape, especially when the sliding door 8 is half opened. As the results, deformation or damage of the wire harness 25 including the corrugated tube 2, interference of the vehicle body 26 with the step 27, and strange noises resulting therefrom will be prevented.

It is to be noted that the harness slack absorbing apparatus 1 can be composed of only the leaf spring 7 without employing the protector 5. In this case, the curved portion 25a of the wire harness 25 including the flat corrugated tube 2 is contained in a recess of the door trim (not shown), for example. Alternatively, the leaf spring 7 may be omitted, but only a member (for example the support member 11 and the curved member 12) for supporting the curved section 2b (FIG. 1) in the forward end of the flat corrugated tube 2 may be provided.

The above described structure of installing the wire harness for the sliding door is also effective as a method of installing the wire harness for the sliding door.

Although the present invention has been fully described by way of examples with reference to the accompanying drawings, it is to be noted that various changes and modifications can be made within the scope of the present invention.

What is claimed is:

1. A structure of installing a wire harness for a sliding door comprising;
   a harness protective tube in which electric wires are contained to compose said wire harness, said harness protective tube being curved at said sliding door side and installed at a vehicle body side,
   wherein said harness protective tube has longer diameter portions, shorter diameter portions, and an oval shape in cross section, and said harness protective tube is curved in a direction of its longer diameter portions at said sliding door side so that said longer diameter portions are positioned in a vertical direction, whereby harness slack absorbing function is imparted to said harness protective tube.

2. The structure of installing a wire harness for a sliding door as claimed in claim 1, wherein said longer diameter portions of said harness protective tube having an oval shape in cross section are supported by a support part at said sliding door side, and said harness protective tube is curved in a direction of said longer diameter portions extending from said support part to said vehicle body side.

3. The structure of installing a wire harness for a sliding door as claimed in claim 2, further comprising a protector in which said support part is positioned, and said harness protective tube having an oval shape in cross section is contained in a curved state in a direction of said longer diameter portions.

4. The structure of installing a wire harness for a sliding door as claimed in any one of claims 1 to 3, wherein said longer diameter portions in a curved section of said harness protective tube are urged upward by an elastic member.

* * * * *